United States Patent
Zeigler et al.

(10) Patent No.: US 7,469,525 B2
(45) Date of Patent: Dec. 30, 2008

(54) FLEXIBLE GUARD FOR RIDE ON MOWER DECK AND CHASSIS

(75) Inventors: David Zeigler, Branchville, SC (US); Linton Lewis, Orangeburg, SC (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 464 days.

(21) Appl. No.: 11/162,312

(22) Filed: Sep. 6, 2005

(65) Prior Publication Data

US 2007/0051086 A1    Mar. 8, 2007

(51) Int. Cl.
*A01D 67/00* (2006.01)

(52) U.S. Cl. ..................................... 56/320.1

(58) Field of Classification Search ............... 56/320.1, 56/17.4, 320.2, 255, DIG. 20, DIG. 24; D15/28; 15/82; 16/225; 428/212
See application file for complete search history.

(56) References Cited

U.S. PATENT DOCUMENTS

| | | | |
|---|---|---|---|
| 2,743,567 A * | 5/1956 | Martin | 56/6 |
| 3,027,701 A * | 4/1962 | Campbell | 56/157 |
| 3,038,288 A * | 6/1962 | Deptula et al. | 56/11.6 |
| 3,053,033 A * | 9/1962 | Maguire | 56/13.6 |
| 3,306,015 A * | 2/1967 | Myers | 56/12.7 |
| 3,369,350 A * | 2/1968 | Rogers et al. | 56/11.9 |
| 3,577,871 A * | 5/1971 | Engler | 56/255 |
| 3,927,513 A * | 12/1975 | Ramaker et al. | 56/320.1 |
| D244,191 S * | 5/1977 | Diehl | D15/28 |
| 4,452,033 A | 6/1984 | Scramuzza | |
| 4,464,862 A * | 8/1984 | Peterson et al. | 47/1.5 |
| 4,693,062 A | 9/1987 | van der Lely et al. | |
| 4,733,522 A | 3/1988 | Johansson | |
| 4,827,704 A | 5/1989 | van der Lely et al. | |
| 4,903,538 A | 2/1990 | ver der Lely et al. | |
| 4,926,621 A * | 5/1990 | Torras | 56/6 |
| 5,005,344 A * | 4/1991 | McCracken | 56/14.7 |
| 5,279,100 A | 1/1994 | Pruitt et al. | |
| 5,331,794 A | 7/1994 | Reichle | |
| 5,337,543 A | 8/1994 | Kitamura et al. | |
| D379,822 S * | 6/1997 | Kishi | D15/17 |

(Continued)

OTHER PUBLICATIONS

PCT International Search Report for corresponding PCT Application No. PCT/US06/23775 dated Jan. 16, 2007.

*Primary Examiner*—Árpád Fábián-Kovács
(74) *Attorney, Agent, or Firm*—Pearne & Gordon LLP (57) ABSTRACT

A flexible guard to protect and to block contact with a plurality of moveable parts of a machine, such as a riding mower or the like may include a piece of flexible material. The flexible guard may also include a first support to attach the piece of flexible material to a first member of the machine or to a chassis of the riding mower. The flexible guard may further include a second support to attach the piece of flexible material to a second member of the machine or a mower deck of the riding mower. The first member or chassis may be moveable relative to the second member or mower deck. The first support provides substantially complete contact between the piece of flexible material and a contour of the first member or chassis and the second support provides substantially complete contact between the piece of flexible material and a contour of the second member or mower deck to protect and to substantially completely block contact with the plurality of moveable parts within the flexible guard.

29 Claims, 4 Drawing Sheets

U.S. PATENT DOCUMENTS

| | | |
|---|---|---|
| 5,953,893 A | 9/1999 | Smith et al. |
| 6,101,794 A | 8/2000 | Christopherson et al. |
| 6,325,195 B1 | 12/2001 | Doherty |
| 6,447,889 B2 * | 9/2002 | Kulkaski .................... 428/212 |
| 6,474,053 B1 | 11/2002 | Lund |
| 6,659,859 B2 | 12/2003 | Nieschulze |
| 6,854,252 B2 | 2/2005 | Foster |
| 2005/0170900 A1 | 8/2005 | Hansen et al. |

* cited by examiner

FLEXIBLE GUARD FOR RIDE ON MOWER DECK AND CHASSIS

BACKGROUND OF THE INVENTION

The present invention relates to guards, barriers or the like, and more particularly to a flexible guard for riding mowers or the like.

Mechanisms, such as riding mowers, lawn tractors and the like, have various parts some of which are in motion or moving when the machinery is operating. Under some circumstances, such as negligence of the operator or the like, these moveable parts could contact or catch portions of clothing worn by the operator or parts of the operators body which could result in injury to the operator or damage to the moveable parts or clothing. Additionally, debris, dust or the like from operation of the mower or lawn tractor could contact and interfere with operation of the moveable parts requiring unscheduled maintenance or possible damage to the parts.

BRIEF SUMMARY OF THE INVENTION

In accordance with an embodiment of the present invention, a flexible guard to protect and to block contact with a plurality of moveable parts of a machine may include a piece of flexible material. The flexible guard may also include a first support to attach the piece of flexible material to a first member of the machine and a second support to attach the piece of flexible material to a second member of the machine. The first member of the machine may be moveable relative to the second member. The first support may provide substantially complete contact between the piece of flexible material and a contour of the first member and the second support may provide substantially complete contact between the piece of flexible material and a contour of the second member to protect and to substantially completely block contact with the plurality of moveable parts within the flexible guard.

In accordance with another embodiment of the present invention, a flexible guard to protect and block contact to block contact with a plurality of moveable parts of a riding mower may include a right hand side piece of flexible material and a left hand side piece of flexible material. The flexible guard may also include a right hand side upper support to attach an upper portion of the right hand side of the piece of flexible material to a chassis of the riding mower. The flexible guard may also include a right hand side lower support to attach a lower portion of the right hand side of the piece of flexible material to a mower deck of the riding mower. The mower deck may be moveable relative to the chassis. The right hand side upper support may provide substantially complete contact between the upper portion of the right hand side piece of flexible material and a right hand side contour of the chassis and the right hand side lower support may provide substantially complete contact between the lower portion of the right hand side piece of flexible material and a right hand side contour of the mower deck to protect and to substantially completely block contact with the plurality of moveable parts within the flexible guard on the right side of the riding mower. The flexible guard may also include a left hand side upper support to attach an upper portion of the left hand side of the piece of flexible material to the chassis of the riding mower. The flexible guard may further include a left hand side lower support to attach a lower portion of the left hand side of the piece of flexible material to a mower deck of the riding mower. The left hand side upper support may provide substantially complete contact between the upper portion of the left hand side piece of flexible material and a left hand side contour of the chassis and the left hand side lower support may provide substantially complete contact between the lower portion of the left hand side piece of flexible material and a left hand side contour of the mower deck to protect and to substantially completely block contact with the moveable parts within the flexible guard from a left side of the riding mower.

In accordance with another embodiment of the present invention, a riding mower may include a chassis and a mower deck movable with respect to the chassis. The riding mower may also include a flexible guard to block contact with moveable parts of the riding mower disposed between the chassis and the mower deck. The flexible guard may include a piece of flexible material. The flexible guard may also include a first support to attach the piece of flexible material to the chassis and a second support to attach the piece of flexible material to the mower deck. The mower deck may be moveable relative to the chassis. The first support may provide substantially complete contact between the piece of flexible material and a contour of the chassis and the second support may provide substantially complete contact between the piece of flexible material and a contour of the mower deck to protect and to substantially completely block contact with the moveable parts within the flexible guard.

In accordance with another embodiment of the present invention, a method for making a riding mower may include providing a chassis and providing a mower deck movable with respect to the chassis. The method may also include attaching a flexible guard to the riding mower to block contact with a plurality of moveable parts of the riding mower when the riding mower is in use and when the mower deck moves relative to the chassis. Attaching the flexible guard may include supporting a piece of flexible material on one side by a first support and on another side by a second support. Attaching the flexible guard may also include attaching the piece of flexible material to the chassis using the first support and attaching the piece of flexible material to the mower deck using the second support. The first support may provide substantially complete contact between the piece of flexible material and a contour of the chassis and the second support may provide substantially complete contact between the piece of flexible material and a contour of the mower deck to protect and to substantially completely block contact with the moveable parts within the flexible guard.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1A:
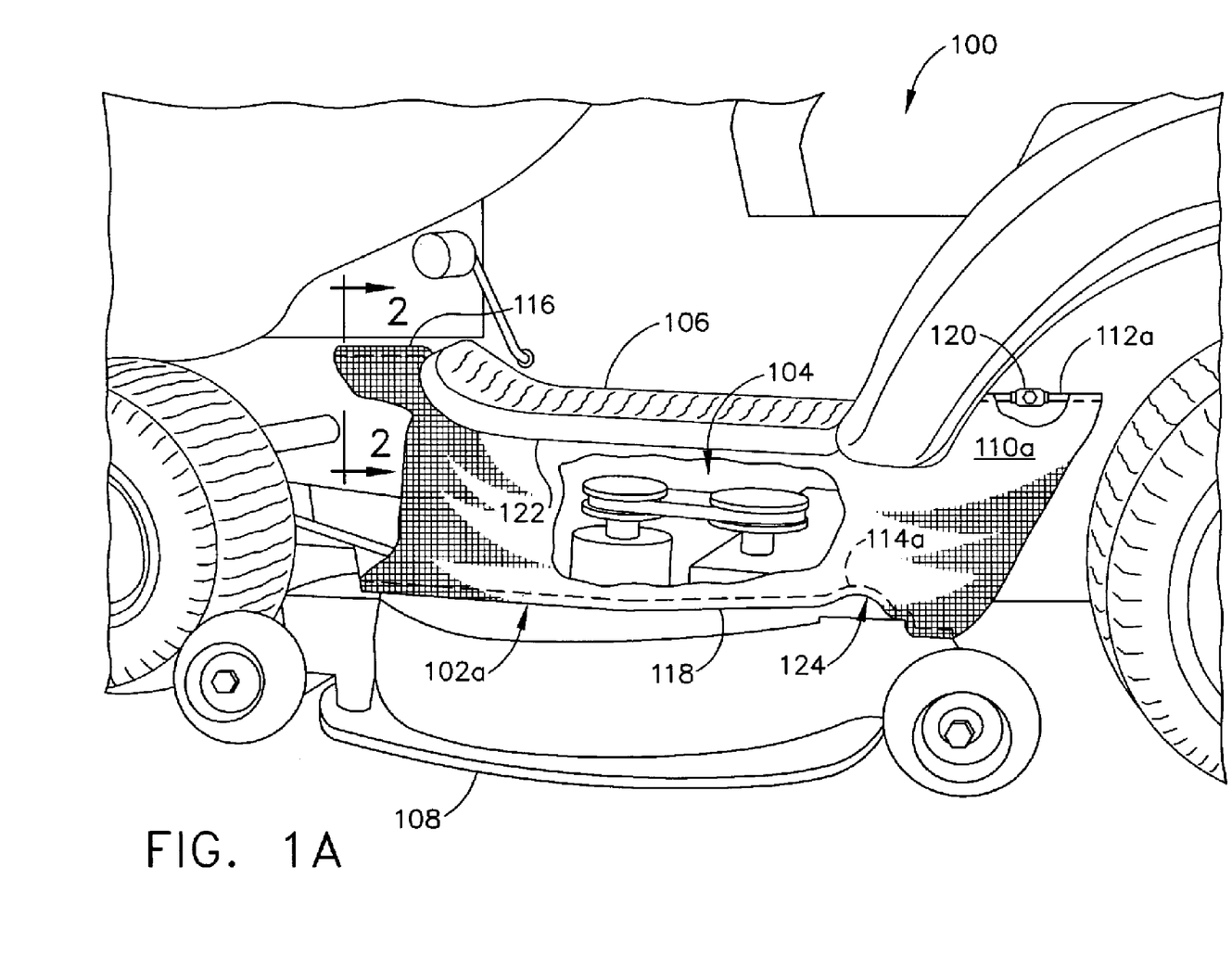
FIG. 1A is a left side perspective view of an example of a riding mower or the like with a flexible guard in accordance with an embodiment of the present invention.
Figure 1B:
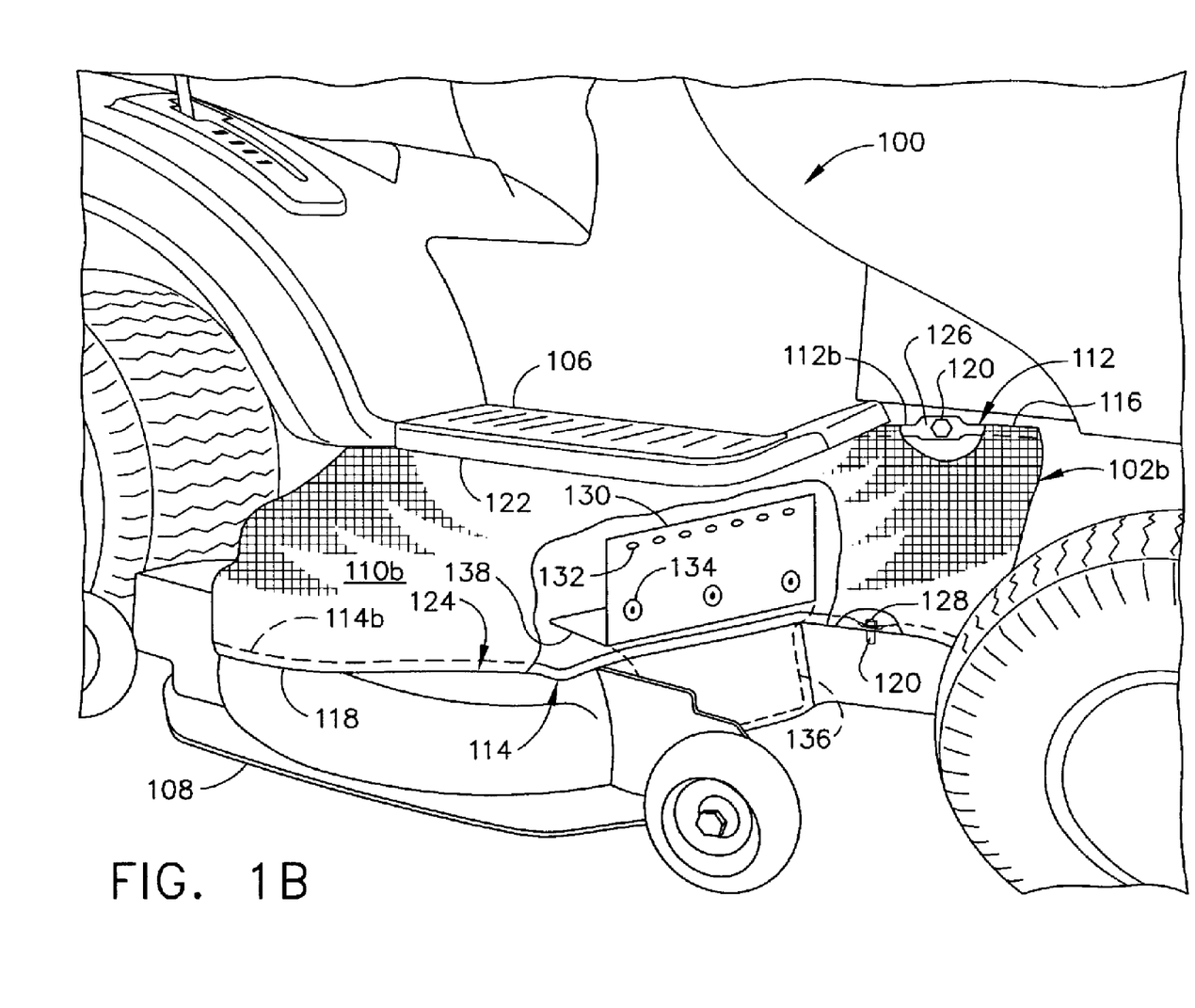
FIG. 1B is a right side perspective view of the riding mower or the like of FIG. 1A with a flexible guard in accordance with an embodiment of the present invention.

FIGS. 1A and 1B are respective left side and right side perspective views of an example of a riding mower 100 or the like with a flexible guard 102 in accordance with an embodiment of the present invention. The flexible guard 102 may include a left hand side guard portion 102a as illustrated in FIG. 1A and a right hand side guard portion 102b as illustrated in FIG. 1B. A plurality of moving parts or moveable parts 104 may be disposed between a chassis 106 of the riding mower 100 and a mower deck 108. The moveable parts 104 may be an arrangement of pulleys and belts, sprockets and chains or similar mechanisms to drive a cutting blade (not shown) or the like with an engine. The moveable parts 104 may also be accessible between the chassis 106 and the mower deck 108 without some sort of barrier or guard, such as flexible guard 102. The guard 102 needs to be flexible because the mower deck 108 is moveable relative to chassis 106 and may be raised and lowered between a highest cutting position closest to the chassis 106 and a lowest cutting position farthest from the chassis 106 and at various heights in between. The deck 108 may also be moveable fore and aft relative to the chassis 106 as the deck is raised and lowered or during operation.

The riding mower 100 illustrated in FIGS. 1A and 1B is merely for purposes of describing the present invention. As used herein, riding mower may refer to any type of lawn tractor, or other vehicle for lawn, turf or vegetation cutting, maintenance, cultivation or the like. The plurality of moveable parts 104 may be any sort of drive mechanism to rotate a cutting blade or to drive another tool associated with the vehicle. The moveable parts 104 may include pulleys and drive belts, chains and sprockets, gears or any sort of mechanical combination of these drive elements or other elements.

While the present invention is described with respect to a riding mower 100, the flexible guard 102 of the present invention may be adapted to substantially block contact with a plurality of moving parts or moveable parts of any sort of machine where the moveable parts are disposed or may be accessible or contacted between a first member, such as chassis 106 of the mower 100 and a second member, such as cutting or mower deck 108, where the first and second members are moveable relative to one another. The flexible guard 102 may also protect the moveable parts 104 from debris, dust or the like that could interfere with operation of the moveable parts 104 requiring unscheduled maintenance or more frequent maintenance or possible damage to the moveable parts 104.

The flexible guard 102 may include a piece 110 of flexible material. There may be a left hand side piece 110a (FIG. 1A) of flexible material and a right hand side piece of flexible material 110b (FIG. 1B). The piece 110 or pieces 110a and 110b of flexible material may be a fabric, such as a man-made fabric. The fabric may be made from polypropylene or the like. The fabric may be woven to form a heavy weight fabric. The fabric may have a density between about 300 grams/square meter and about 500 grams/square meter; although, other fabric densities or other materials that provide sufficient protection, flexibility and durability characteristics may also be used. The fabric may be heated treated for thermal stabilization.

A first support 112 or upper support rod and a second support 114 or lower support rod may be attached to the piece 110 of material to support the piece 110 of flexible material and to facilitate shaping the form of the flexible guard 102. The first support 112 may be used to attach an upper edge or side 116 the piece 110 of flexible material to the chassis 106 and the second support 114 may be used attach a lower edge or side 118 of the piece 110 of flexible material to the mower deck 108. The first and second supports 112 and 114 support and may be used to attach the piece 110 of flexible material to the chassis 106 and mower deck 108 respectively by a plurality of fasteners 120 or the like. The first support 112 and the second support 114 may be metal rods or the like. The first support 112 may be formed or bent to conform substantially to a contour 122 of the chassis 106 and the second support 114 may be formed or bent to conform substantially to a contour 124 of the mower deck 108. Accordingly, the first support 112 may provide substantially complete contact between the piece 110 of flexible material and the contour 122 of the chassis 106 and the second support 116 may provide substantially complete contact between the piece 110 of flexible material and the contour 124 of the mower deck 108. Thus, protecting the moveable parts 104 and substantially completely blocking any contact, inadvertent or otherwise, with the plurality of moveable parts 104 contained within the guard 102 when the guard 102 is attached to the chassis 106 and mower deck 108 as illustrated in FIG. 1.

There may be a left hand side upper support 112a to attach the upper portion or side 116 of the left hand side piece 110a of material to the chassis 106, and a left hand side lower support 114a to attach the lower portion or side 118 of the left hand side piece 110a of material to the mower deck 108 on the left hand side of the mower 100 as illustrated in FIG. 1A. Similarly, there may be a right hand side upper support 112b to attach the upper portion or side 116 of the left hand side piece 110b of material to a right hand side of the chassis 106, and a right hand side lower support 114b to attach the lower portion or side 118 of the right hand side piece 110b of material to the mower deck 108 on the right hand side of the mower 100 as illustrated in FIG. 1B.

Each of the support rods 112 and 116 may be formed with flat portions 126 at predetermined locations to facilitate attaching the flexible guard 102 to the chassis 106 and mower deck 108. An opening 128 may be formed in each of the flat portions 126 through which a fastener 120, such as a bolt or the like, may be inserted and attached to the chassis 106 or mower deck 108 to secure the flexible guard 102 in place on the mower 100. Each of the metal support rods 112 and 114 may have a diameter of between about 0.3 inches and about 0.8 inches or a sufficient diameter to permit each of the support rods 112 and 116 to be flattened at the predetermined locations to form the flat portions 126 and openings 128 and sufficient stiffness or rigidity to retain the shape and structure of the guard and to close gaps and prevent contact with the movable parts 104.

The flexible guard 102 may also include one of more substantially rigid guard portions 130. The substantially rigid guard portion 130 or guard portions may be positioned at predetermined locations relative to the piece 110 of flexible material and the moveable parts 104 to prevent the piece 110 of flexible material from contacting any of the moveable parts 104 when the mower deck 108 moves relative to the chassis 106 during operation of the mower 100 or at other times. The substantially rigid guard portion 130 or portions may eliminate the possibility of any pinch points or abrasion to the piece 110 of flexible material that may contact the moveable parts 104 when the mower deck 108 moves up and down relative to the chassis 106 of the mower 100.

The substantially rigid guard portion 130 may be a high density polyethylene or similar plastic type material. The guard portion may also be a metal or other material capable of providing such protection. The guard portion 130 may have a thickness of about 0.040 centimeters or more. The guard portions 130 may be attached to the flexible guard 102, to the chassis 106 or to the mower deck 108. The guard portion 130 may be attached to the flexible guard 102 by sewing using a heavy duty, multi-fiber or filament thread 132 or the like as illustrated by the broken line or stitches in FIG. 1B. In another embodiment of the present invention, the guard portion 130 or portions may be attached by rivets 134 or other types of fasteners. In other embodiments, some interior guard portions may be attached by sewing and others by rivets or other fasteners depending upon whether one method may be more appropriate than another.

In one embodiment of the present invention, the guard portion 130 may include an extension member 136 as illustrated in phantom in FIG. 1B. The extension member 136 may extend outside of the flexible guard 106 to cover any gaps between in the structure of the mower deck 108, chassis 106 or open area there between that may otherwise be difficult to cover because of possible unique geometric structures of some mower decks and chassis. The extension member 136 may not be attached to the mower deck 136 so as to permit the deck 136 to move relative to the chassis 106 as previously described and the extension member 136 may just slide over the mower deck 108 as it moves relative the chassis 106.

In another embodiment of the present invention, an extension member 138 may extent or project into an interior of the flexible guard to prevent access to the moving parts 104 under and behind the support rod 114. The extension member 138 may be formed or bent at a predetermined angle relative to the remainder of guard portion 130. An example of extension member 138 will be described in more detail with reference to FIG. 3.

Figure 2:
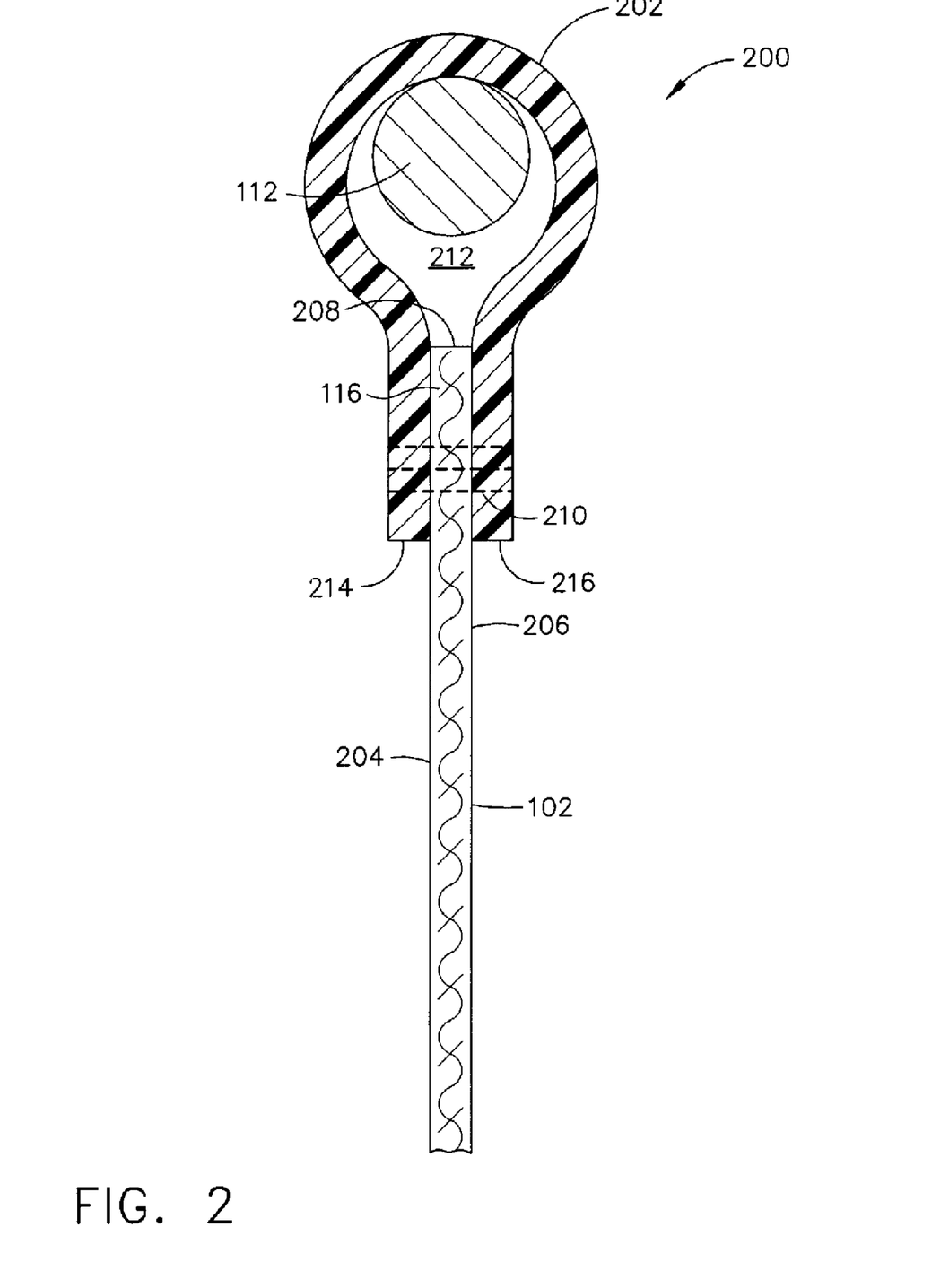
FIG. 2 is a detailed cross-sectional view of a portion of the flexible guard of FIGS. 1A and 1B taken along lines 2-2 in FIG. 1A illustrating an example of attaching the flexible guard to a support rod in accordance with an embodiment of the present invention.

FIG. 2 is a detailed cross-sectional view of a portion 200 of the flexible guard 102 of FIGS. 1A and 1B taken across lines 2-2 in FIG. 1A illustrating an example of attaching the flexible guard 102 to the one of the support rods 116 in accordance with an embodiment of the present invention. A strap 202 may be looped and attached on opposite sides 204 and 206 of the flexible guard 102 proximate to an end 208 of the flexible guard 102. The strap 202 may be attached to the flexible guard 102 by stitching 210, an adhesive or similar means or combinations thereof. The strap 202 may be made from a similar material or fabric as the flexible guard 102. The stitching may be a heavy duty material, such as a multi-fiber or filament thread formed from polypropylene or similar material.

In another embodiment of the present invention, the end 208 of the flexible guard 102 may be looped on itself and then attached to one of the sides 204 or 206 of the flexible guard 102. The looped portion may be attached by stitching or the like similar to that described above with respect to the strap 202.

The looped strap 202 may form an opening 212 through which the support rod 116 (as illustrated in FIG. 2) or 118 may be inserted or received. Ends 214 and 216 of the strap 202 and the end of the flexible guard 208 may be hemmed, heat sealed or the similar operation to provide additional strength and to prevent the ends of the material from unraveling or coming apart over time. Accordingly, the fabric guard 102 is formed to be durable and long-lasting under extreme conditions and demanding use. The looped strap 202, support rods 112 and 114 and openings or attachment points 128 also keep the guard 102 from sliding out of position and possibly exposing the moving parts 104.

Figure 3:
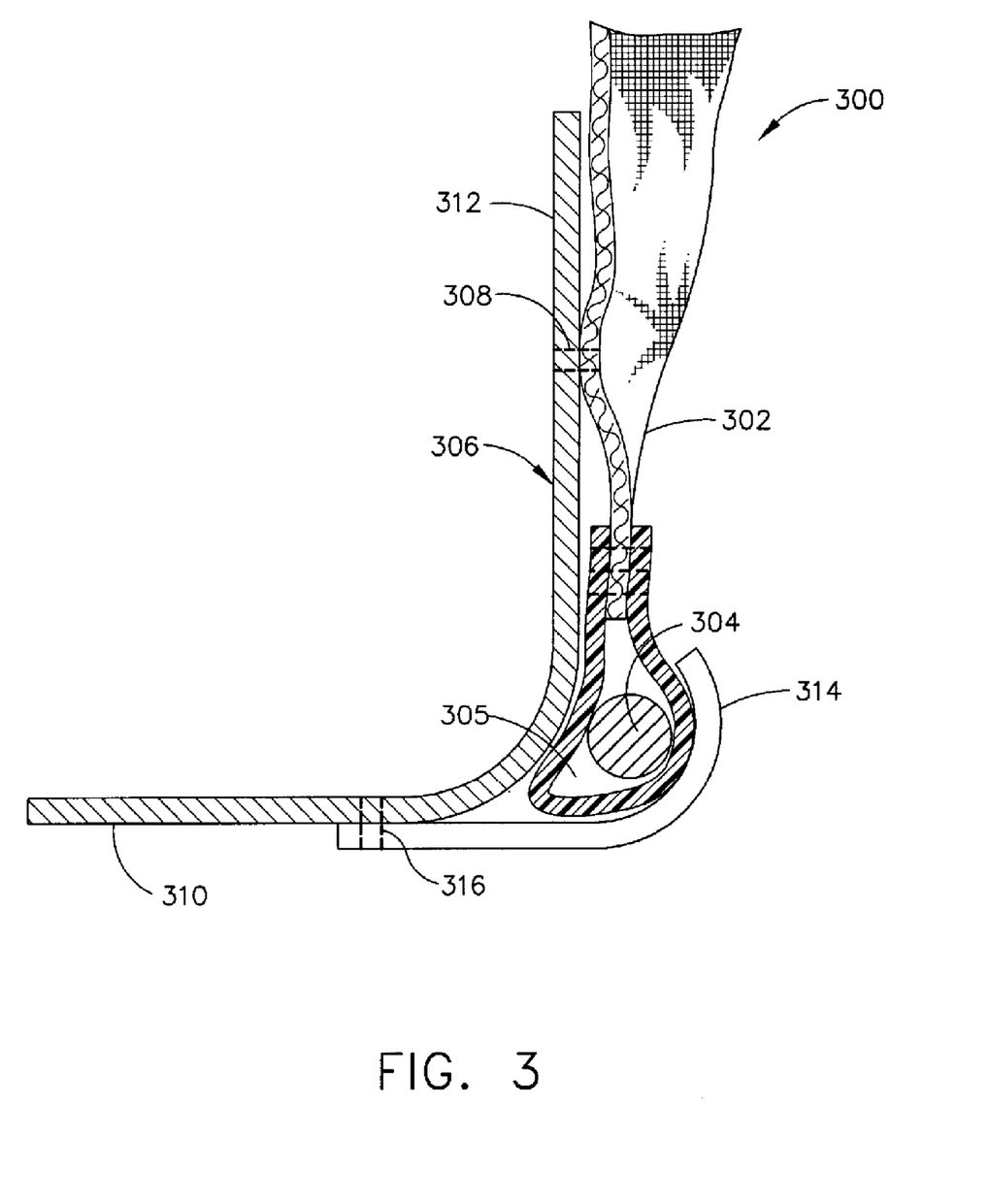
FIG. 3 is a side elevation view of a guard portion of a flexible guard in accordance with another embodiment of the present invention.

FIG. 3 is a side elevation view of a guard portion 300 of a flexible guard in accordance with another embodiment of the present invention. The guard portion 300 may be a section of the flexible guard 102 of FIGS. 1A and 1B. The guard portion 300 may include a piece of flexible material 302 or fabric that may be the same as the flexible material 110 of FIGS. 1A and 1B. A support rod 304, similar to support rods 112 and 114, may also extend through an opening 305 formed at an end of the flexible material 302. The opening 305 for the support rod 304 may be formed by a strap similar to that described with respect to FIG. 2.

A substantially rigid member 306 may be attached to the piece of flexible material 302. The substantially rigid member 306 may be attached to the flexible material 302 by sewing using a heavy or multi-fiber thread 308 illustrated by a broken line in FIG. 3. The heavy thread 308 may be similar to the thread 132 in FIG. 1B. The rigid member 306 may also be attached to the flexible material 302 by other means, such as rivets or other fasteners. The substantially rigid member 306 may also be bent or formed at a predetermined angle to form an extension 310. The extension 310 may be the same as extension member 138 in FIG. 1B. The extension 310 may prevent access to moving parts under and behind the support rod 304 that may be created by the geometry of a mower deck, chassis or similar part. Thus, the extension 310 may extend or project horizontally relative to the mower deck 108 in FIG. 1B to prevent a person from reaching under the support rod 304 (or 114 in FIG. 1A or 1B) to contact the moving parts. A section 312 of rigid member 306 that may be substantially orthogonal or vertical to the extension 310 may prevent a person from pushing or depressing an area of the flexible material 302 or fabric close to the moving parts and possibly contacting the moving parts with the flexible material 302 or fabric. Such contact directly to the material 302 without the guard section 312 could cause excessive wear and possible damage to the material 302.

A retainer element 314 may be provided to hold the extension 310 of the rigid member 306 in a correct, intended position relative to the support rod 304 and the vertical section 312. The retainer element 314 may also facilitate maintaining the predetermined angle of the extension 310 relative to the other section or vertical section 312 of the rigid member 306. The retainer element 314 may be formed from an extruded plastic or metal shaped to hold the extension 310 in the correct, intended position and to maintain the predetermined angle of the extension 310 relative to section 312 of the rigid member 306. As illustrated in FIG. 3, the retainer element 314 may be semicircular, substantially "L" shaped or a similar shape to maintain the extension 310 at about the predetermined angle, such as 90 degrees, relative to the other section 312 of the rigid member 306. The retainer element 314 may be attached to the rigid member by sewing using a heavy-duty thread 316, a multi-filament thread or the like similar to that previously discussed for attaching other substantially rigid guard portions. Alternatively, the retainer element 314 may be attached by other means, such as rivets or other type fasteners.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A flexible guard on a riding mower with a chassis and a mower deck vertically movable relative to the chassis between a highest cutting position closest to the chassis and a lowest cutting position furthest from the chassis, the flexible guard being for protecting and blocking of contact with a plurality of moveable parts of riding mower located between the chassis and the mower deck, comprising:
a piece of flexible material;
a first support attaching the piece of flexible material to the chassis at a location beneath the chassis; and
a second support attaching the piece of flexible material to the mower deck at a location above the mower deck,
the first support is configured to provide substantially complete contact between the piece of flexible material and a contour of the chassis and the second support is configured to provide substantially complete contact between the piece of flexible material and a contour of the mower deck to protect and to substantially completely block contact with the plurality of moveable parts within the flexible guard, the piece of flexible material has a dimension measured in the direction between the chassis and the mower deck that is at least as large as the distance between the chassis and the mower deck when the mower deck is at the lowest cutting position furthest from the chassis such that the flexible material is flexed when the mower deck is at any position within a range bounded by the highest cutting position and the lowest cutting position.

2. The flexible guard of claim 1, wherein the flexible guard is not tightly stretched.

3. The flexible guard of claim 1, wherein the flexible guard generally encircles the plurality of moveable parts that are protected and substantially completely blocked of contact under the chassis.

4. The flexible guard of claim 1, wherein the piece of flexible material comprises a fabric that remains loose to accommodate the mower deck vertically movement relative to the chassis between the highest cuffing position closest to the chassis and the lowest cuffing position furthest from the chassis.

5. The riding mower of claim 1, wherein the flexible guard does not form a crop particle slide.

6. The flexible guard of claim 1, further comprising at least one substantially rigid guard portion at a predetermined location relative to the piece of flexible material and the plurality of moveable parts to prevent the piece of flexible material from contacting the plurality of moveable parts when the second member moves relative to the first member.

7. The flexible guard of claim 6, wherein the at least one substantially rigid guard portion is attached to at least one of the piece of flexible material proximate to the plurality of moveable parts, the first member or the second member.

8. The flexible guard of claim 7, wherein the at least one substantially rigid guard portion is attached to piece of flexible material by sewing.

9. The flexible guard of claim 7, wherein the at least one substantially rigid guard portion comprises an extension extending at a predetermined angle relative to the rigid guard portion.

10. The flexible guard of claim 9, further comprising a retainer element to hold the extension in a predetermined position and to maintain the predetermined angle.

11. A flexible guard on a riding mower with a chassis and a mower deck vertically movable relative to the chassis between a highest cutting position closest to the chassis and a lowest cutting position furthest from the chassis, the flexible guard being for protecting and blocking of contact with a plurality of moveable parts of riding mower located between the chassis and the mower deck, comprising:
a right hand side piece of flexible material;
a separate, left hand side piece of flexible material;
a right hand side upper support to attach an upper portion of the right hand side of the piece of flexible material to a chassis of the riding mower;
a right hand side lower support to attach a lower portion of the right hand side of the piece of flexible material to a mower deck of the riding mower, wherein the mower deck is moveable relative to the chassis and wherein the right hand side upper support provides substantially complete contact between the upper portion of the right hand side piece of flexible material and a right hand side contour of the chassis and the right hand side lower support provides substantially complete contact between the lower portion of the right hand side piece of flexible material and a right hand side contour of the mower deck to protect and to substantially completely block contact with the plurality of moveable parts within the flexible guard; and
a left hand side upper support to attach an upper portion of the left hand side of the piece of flexible material to the chassis of the riding mower; a left hand side lower support to attach a lower portion of the left hand side of the piece of flexible material to a mower deck of the riding mower, wherein the left hand side upper support provides substantially complete contact between the upper portion of the left hand side piece of flexible material and a left hand side contour of the chassis and the left hand side lower support provides substantially complete contact between the lower portion of the left hand side piece of flexible material and a left hand side contour of the mower deck to protect and to substantially completely block contact with the moveable parts within the flexible guard.

12. The flexible guard of claim 11, wherein the flexible guard is not tightly stretched.

13. The flexible guard of claim 11, wherein the flexible guard generally encircles the plurality of moveable parts that are protected and substantially completely blocked of contact under the chassis.

14. The flexible guard of claim 11, wherein the piece of flexible material comprises a fabric that remains loose to accommodate the mower deck vertically movement relative to the chassis between the highest cutting position closest to the chassis and the lowest cutting position furthest from the chassis.

15. The riding mower of claim 11, wherein the flexible guard does not form a crop particle slide.

16. The flexible guard of claim 15, further comprising at least one substantially rigid guard portion at a predetermined location relative to the pieces of flexible material and the plurality of moveable parts to prevent the pieces of flexible material from contacting the moveable parts when the mower deck moves relative to the chassis.

17. The flexible guard of claim 16, wherein the at least one substantially rigid guard portion is attached to at least one of an interior portion of at least one of the pieces of flexible material, the chassis or the mower deck.

18. A riding mower, comprising:
a chassis;
a mower deck vertically movable relative to the chassis between a highest cutting position closest to the chassis and a lowest cutting position furthest from the chassis;
a flexible guard to block contact with moveable parts of the riding mower disposed between the chassis and the mower deck, the flexible guard comprising:
a piece of flexible material;
a first support attaching the piece of flexible material to the chassis at a location beneath the chassis; and
a second support attaching the piece of flexible material to the mower deck at a location above the mower deck,
the first support is configured to provide substantially complete contact between the piece of flexible material and a contour of the chassis and the second support is configured to provide substantially complete contact between the piece of flexible material and a contour of the mower deck to protect and to substantially completely block contact with the plurality of moveable parts within the flexible guard, the piece of flexible material has a dimension measured in the direction between the chassis and the mower deck that is at least as large as the distance between the chassis and the mower deck when the mower deck is at the lowest cutting position furthest from the chassis such that the flexible material is flexed when the mower deck is at any position within a range bounded by the highest cutting position and the lowest cutting position.

19. The riding mower of claim 18, wherein the flexible guard is not tightly stretched.

20. The riding mower of claim 18, wherein the flexible guard generally encircles the plurality of moveable parts that are protected and substantially completely blocked of contact under the chassis.

21. The flexible guard of claim 18, wherein the piece of flexible material comprises a fabric that remains loose to accommodate the mower deck vertically movement relative to the chassis between the highest cutting position closest to the chassis and the lowest cutting position furthest from the chassis.

22. The riding mower of claim 18, wherein the flexible guard does not form a crop particle slide.

23. The riding mower of claim 18, further comprising at least one substantially rigid guard portion at a predetermined location relative to the piece of flexible material and the moveable parts to prevent the piece of flexible material from contacting the moveable parts when the mower deck moves relative to the chassis.

24. A method for making a riding mower comprising:
providing a chassis;
providing a mower deck located beneath the chassis and movable with respect to the chassis, the mower deck being movable between a highest cutting position closest to the chassis and a lowest cutting position furthest from the chassis; and
attaching a flexible guard to the riding mower beneath the chassis and above the mower deck to block contact with a plurality of moveable parts of the riding mower when the riding mower is in use and when the mower deck moves relative to the chassis, the piece of flexible material having a dimension measured in the direction between the chassis and the mower deck that is at least as large as the distance between the chassis and the mower deck when the mower deck is at the lowest cutting position furthest from the chassis such that the flexible material is flexed when the mower deck is at any position within a range bounded by the highest cutting position and the lowest cutting position,
wherein attaching the flexible guard comprises:
supporting a piece of flexible material on one side by a first support and on another side by a second support; and
attaching the piece of flexible material to the chassis using the first support; and attaching the piece of flexible material to the mower deck using the second support,
wherein the first support provides substantially complete contact between the piece of flexible material and a contour of the chassis and the second support provides substantially complete contact between the piece of flexible material and a contour of the mower deck to protect and to substantially completely block contact with the moveable parts within the flexible guard.

25. The method of claim 24, wherein the flexible guard is not tightly stretched.

26. The method of claim 24, wherein the flexible guard generally encircles the plurality of moveable parts that are protected and substantially completely blocked of contact under the chassis.

27. The method of claim 24, wherein the piece of flexible material comprises a fabric that remains loose to accommodate the mower deck vertically movement relative to the chassis between the highest cutting position closest to the chassis and the lowest cutting position furthest from the chassis.

28. The method of claim 24, wherein the flexible guard does not form a crop particle slide.

29. The method of claim 24, further comprising attaching at least one substantially rigid guard portion at a predetermined location relative to the piece of flexible material and the moveable parts to prevent the piece of flexible material from contacting the moveable parts when the riding mower is in operation and the mower deck moves relative to the chassis.

* * * * *